United States Patent
Senga

(10) Patent No.: US 9,701,052 B2
(45) Date of Patent: Jul. 11, 2017

(54) FIXED PLATEN OF INJECTION MOLDING MACHINE

(71) Applicant: FANUC Corporation, Yamanashi (JP)

(72) Inventor: Masatoshi Senga, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 14/987,761

(22) Filed: Jan. 5, 2016

(65) Prior Publication Data

US 2016/0200020 A1    Jul. 14, 2016

(30) Foreign Application Priority Data

Jan. 8, 2015  (JP) ................................. 2015-002433

(51) Int. Cl.
  *B29C 45/17*    (2006.01)
(52) U.S. Cl.
  CPC ...... *B29C 45/1744* (2013.01); *B29C 45/1747* (2013.01); *B29C 45/1761* (2013.01)
(58) Field of Classification Search
  CPC ............ B29C 45/1744; B29C 45/1747; B29C 45/1761
  See application file for complete search history.

(56) References Cited

U.S. PATENT DOCUMENTS

2007/0224308 A1    9/2007  Nishimura et al.
2016/0031139 A1*   2/2016  Shioiri ................ B29C 45/1744
                                                    425/593

FOREIGN PATENT DOCUMENTS

| JP | 2000-211000 A | 8/2000 |
| JP | 2000-238100 A | 9/2000 |
| JP | 2000-289069 A | 10/2000 |
| JP | 2003-25378 A | 1/2003 |
| JP | 2007-253532 A | 10/2007 |
| JP | 2010-228429 A | 10/2010 |

OTHER PUBLICATIONS

Decision to Grant a Patent in JP Application No. JP2015-002433, mailed Mar. 8, 2016.

* cited by examiner

*Primary Examiner* — Jill Heitbrink
(74) *Attorney, Agent, or Firm* — Hauptman Ham, LLP

(57) ABSTRACT

A fixed platen of an injection molding machine is provided with a first leg protruding at a substantially central portion of a lower part and secured to a base frame and second legs protruding left and right. Each of the second legs is provided with a thin portion thinner than the fixed platen. Thus, a deformation difference between the upper and lower sides of the fixed platen caused during nozzle touch operation or when the fixed platen is subjected to a mold clamping force can be reduced.

2 Claims, 5 Drawing Sheets

FIXED PLATEN OF INJECTION MOLDING MACHINE

RELATED APPLICATIONS

The present application claims priority to Japanese Application Number 2015-002433, filed Jan. 8, 2015, the disclosure of which is hereby incorporated by reference herein in its entirety.

BACKGROUND OF THE INVENTION

Field of the Invention

The present invention relates to a fixed platen of an injection molding machine.

Description of the Related Art

FIG. 5 is a schematic view for illustrating the configuration of a conventional injection molding machine. In the injection molding machine, a mold clamping mechanism section 1 and an injection mechanism section 2 are opposed to each other on a base frame 4. In a nozzle touch mechanism 3 between the mold clamping mechanism section 1 and the injection mechanism section 2, a nozzle at the tip of a screw 17 is in close contact with a resin injection port of a fixed mold 7.

The mold clamping mechanism section 1 comprises a fixed platen 5 and a movable platen 6 arranged along a mold clamping axis. Tie rods 25 are passed through tie-rod insertion parts 24 of the fixed platen 5. Also for the movable platen 6, the fixed and movable platens 5 and 6 are mounted so that the movable platen 6 is movable along the mold clamping axis by passing the tie rods 25 through tie-rod insertion parts (not shown). A mold clamping space is defined between the fixed and movable platens 5 and 6. The fixed mold 7 is mounted on the mold-clamping-space side of the fixed platen 5. A movable mold 8 is mounted on the mold-clamping-space side of the movable platen 6.

The movable platen 6 is connected with a crosshead link 11, a toggle mechanism, which is connected to a nut for a ball screw 12. The axis of the ball screw 12 is driven by a servomotor 14 through a pulley or pulleys and a belt system 13. The fixed and movable molds 7 and 8 are opened and closed and mold clamping is performed by driving the servomotor 14 to advance and retreat the movable platen 6 relative to the fixed platen 5.

In the injection mechanism section 2, a resin material 9 stored in a hopper 26 is melted as it is fed forward relative to a cylinder by the rotation of the screw 17 caused by the rotation of a metering servomotor 15 and heating by a heater 10 and is pooled in place. The molten resin material 9 is injected into a cavity in the fixed mold 7 by rotating an injection servomotor 16 to advance the screw 17.

Thereafter, the resin material 9 is cured in the mold set by the mold clamping between the fixed and movable molds 7 and 8 and a molded article is molded. After the molding, the product is ejected by an ejector pin (not shown) or the like.

FIG. 6 is a perspective view showing the base frame 4 and the fixed platen 5 of the injection molding machine. The base frame 4 comprises two upper main pipes 32, which are arranged parallel to each other on the upper side, and two parallel lower main pipes 33 on the lower side. A space between the two upper main pipes 32 serves as a molded product chute opening 31.

The upper and lower main pipes 32 and 33 are connected by a plurality of vertical posts 34. The mold clamping mechanism section 1, injection mechanism section 2, and the like are supported by the upper and lower main pipes 32 and 33.

The fixed platen 5 is secured to the base frame 4. The fixed platen 5 is urged to tilt by a nozzle touch force generated when a nozzle on the distal end of the injection cylinder is brought into close contact during the molding and a mold clamping force generated by the mold clamping. In order to prevent the fixed platen 5 from tilting, the fixed platen 5 is secured to the steel material of the upper main pipes 32 of the base frame 4 by bolts or the like.

FIG. 8 shows an example of fixation of the fixed platen 5 of the conventional injection molding machine. The fixed platen 5 shown in FIG. 8 is firmly secured to the upper main pipes 32 of the base frame 4. Further, techniques disclosed in the following prior art patent documents are alternative fixing methods.

As shown in FIG. 9, Japanese Patent Application Laid-Open No. 2000-238100 discloses a technique in which a leg protruding from the main body of a fixed platen 5 is provided at a substantially central portion of the lower side of the fixed platen secured to a base frame.

Japanese Patent Application Laid-Open No. 2000-289069 discloses a technique in which a fixed platen is prevented from tilting by being supported by connecting a rib thereon and a prop on a base frame.

Japanese Patent Application Laid-Open No. 2003-25378 discloses a technique in which a fixed platen is prevented from falling down by extending a mounting surface of the fixed platen toward an injection device so that its extended portion can be secured to a frame by bolts.

Japanese Patent Application Laid-Open No. 2007-253532 discloses a technique in which legs having means for securing a fixed platen to a base frame are provided on bottom parts on opposite sides of the fixed platen and a fall prevention leg is provided on the central bottom part of the fixed platen.

In the technique shown in FIG. 8, the fixed platen 5 is firmly secured to the upper main pipes 32 of the base frame 4. If the fixed platen 5 thus secured is subjected to a mold clamping force, deformation of the lower part of the fixed platen 5 secured to the base frame 4 is suppressed due to the rigidity of the base frame 4, as shown in FIG. 7. Since the upper part is not secured, in contrast, the degree of deformation is asymmetric, so that the upper part may considerably bend in some cases. Therefore, elongation of the tie rods 25 also varies, so that the application of the mold clamping force to the fixed and movable molds 7 and 8 may possibly be uneven.

In the technique disclosed in Japanese Patent Application Laid-Open No. 2000-238100, vertical variation in deformation of the fixed platen 5 due to thermal expansion and mold clamping force is suppressed. Since the base frame 4 is expected to secure a wide product chute opening under a mold mounting portion, however, that part of the base frame 4 which lies below the mold clamping mechanism section 1 is lower in rigidity than end portions. Possibly, therefore, the resulting structure may be susceptible to falling caused by nozzle touching.

SUMMARY OF THE INVENTION

Accordingly, the object of the present invention is to provide a fixed platen of an injection molding machine, capable of being prevented from bending vertically asymmetrically when a mold clamping force is generated while being prevented from falling down due to a nozzle touch force.

A fixed platen of an injection molding machine according to the present invention, which is secured to a base frame and can support a fixed mold, comprises a mold mounting surface capable of being fitted with a mold, a tie-rod insertion part at a corner through which a tie rod is configured to be passed for fixation, a first leg protruding at a substantially central portion of a lower part and secured to the base frame, and a second leg protruding near the tie-rod insertion part at the lower part and secured to the base frame. The second leg comprises a thin portion thinner than the fixed platen along the axis of the tie rod and respective thickness-direction centers of the thin portion and the fixed platen are substantially coincident along the axis of the tie rod.

Thus, the legs of the fixed platen are made thinner to be more easily deformable, so that the tie-rod insertion part secured to the base frame can be more easily deformed. Further, a deformation difference between the upper and lower sides of the fixed platen caused during nozzle touch operation or when the fixed platen is subjected to a mold clamping force can be reduced. Since the fixed platen is secured to the base frame by the first and second legs at spots near the substantially central portion and end portions, the degree of fall of the fixed platen caused by a nozzle touch force can be made lower than in the case where the fixed platen is secured only at the central portion.

The first leg may be configured to extend in an opposite direction to the mold mounting surface and be secured to the base frame.

Thus, the space between first and second legs along an injection axis can be widened, so that the degree of fall of the fixed platen caused by the nozzle touch force can be further reduced.

According to the present invention, there can be provided a fixed platen of an injection molding machine, capable of being prevented from bending vertically asymmetrically when a mold clamping force is generated while being prevented from falling down due to a nozzle touch force.

BRIEF DESCRIPTION OF THE DRAWINGS

The above and other objects and features of the present invention will be obvious from the ensuing description of embodiments with reference to the accompanying drawings, in which.

DETAILED DESCRIPTION OF THE PREFERRED EMBODIMENTS

First Embodiment

Figure 1:
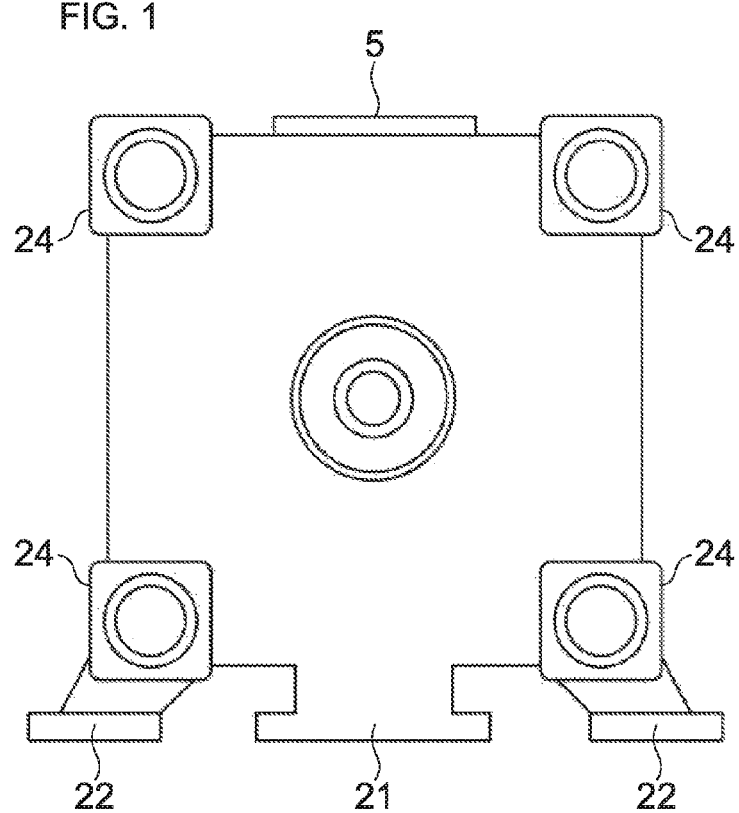
FIG. 1 is a front view of a fixed platen according to a first embodiment of the present invention.
Figure 2:
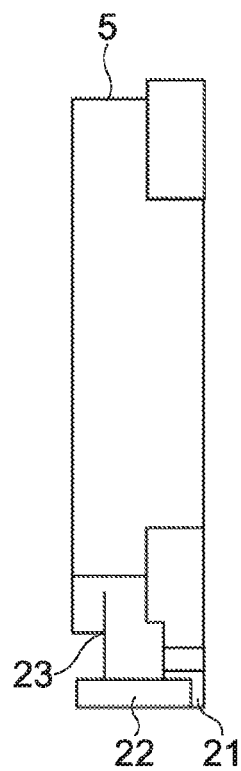
FIG. 2 is a side view of the fixed platen according to the first embodiment of the present invention.

A first embodiment of the present invention will now be described with reference to the accompanying drawings. FIG. 1 is a front view of a fixed platen 5 according to the present embodiment taken from the opposite side to an injection unit 2 when it is mounted in place. FIG. 2 is a side view of the fixed platen 5. The fixed platen 5 of the present embodiment comprises a plurality of legs. In the front view of FIG. 1, a first leg 21 is provided at a substantially central portion with respect to the horizontal direction, and two second legs 22 protrude individually from the respective lower parts of left and right tie-rod insertion parts 24. As shown in FIG. 2, moreover, each of the left and right second legs 22 is formed with a thin portion 23 made thinner along the axis of each tie rod near a central portion between the fixed platen 5 and a base frame 4 with respect to the vertical direction. The thin portion 23 is located so that its position along the axis of each tie rod is at the substantially central portion. Thus, the respective thickness-direction centers of the fixed platen 5 and the thin portion 23 are substantially coincident. The front and rear surfaces of the thin portion 23 are formed substantially parallel to a mold mounting portion of the fixed platen 5.

Thus, the fixed platen 5 is secured to the base frame 4 at three points, the first leg 21 in the center and the left and right second legs 22. When the fixed platen 5 is subjected to a nozzle touch force, therefore, its vertical falling and horizontal rotation can be suppressed. In some of the conventional techniques described above, the fixed platen 5 is secured by only one of the first and second legs 21 and 22. With this configuration, the fixed platen 5 may possibly be caused to fall down or horizontally rotate by the nozzle touch force.

Since the first leg 21 is provided at the substantially central portion that is less deformable, the degree of deformation is not influenced if the strength of the leg is increased. In the present embodiment, therefore, the thickness of the central first leg 21 is made substantially equal to that of the fixed platen 5, and only the left and right second legs 22 are provided with the thin portion 23 each. With this configuration, moderate deformation can be caused near the tie-rod insertion parts 24 while preventing falling and horizontal rotation by the nozzle touch force.

Figure 3:
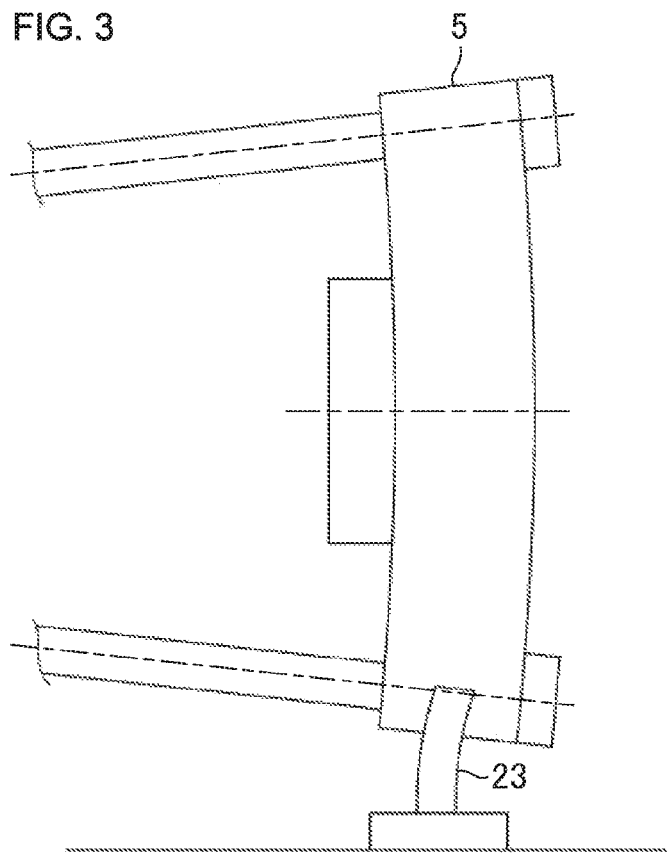
FIG. 3 shows a deformed shape of the fixed platen according to the embodiment of the present invention.

FIG. 3 shows a deformed shape of the fixed platen 5 of the present embodiment subjected to a force. Provided with the thin portion 23, each of the left and right second legs 22 can also be moderately deformed below the fixed platen 5, so that a deformation difference between the upper and lower parts of the fixed platen 5 can be reduced.

Second Embodiment

Figure 4:
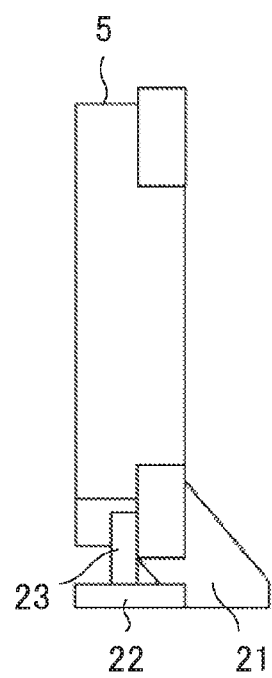
FIG. 4 is a side view of a fixed platen according to a second embodiment of the present invention.
Figure 5:
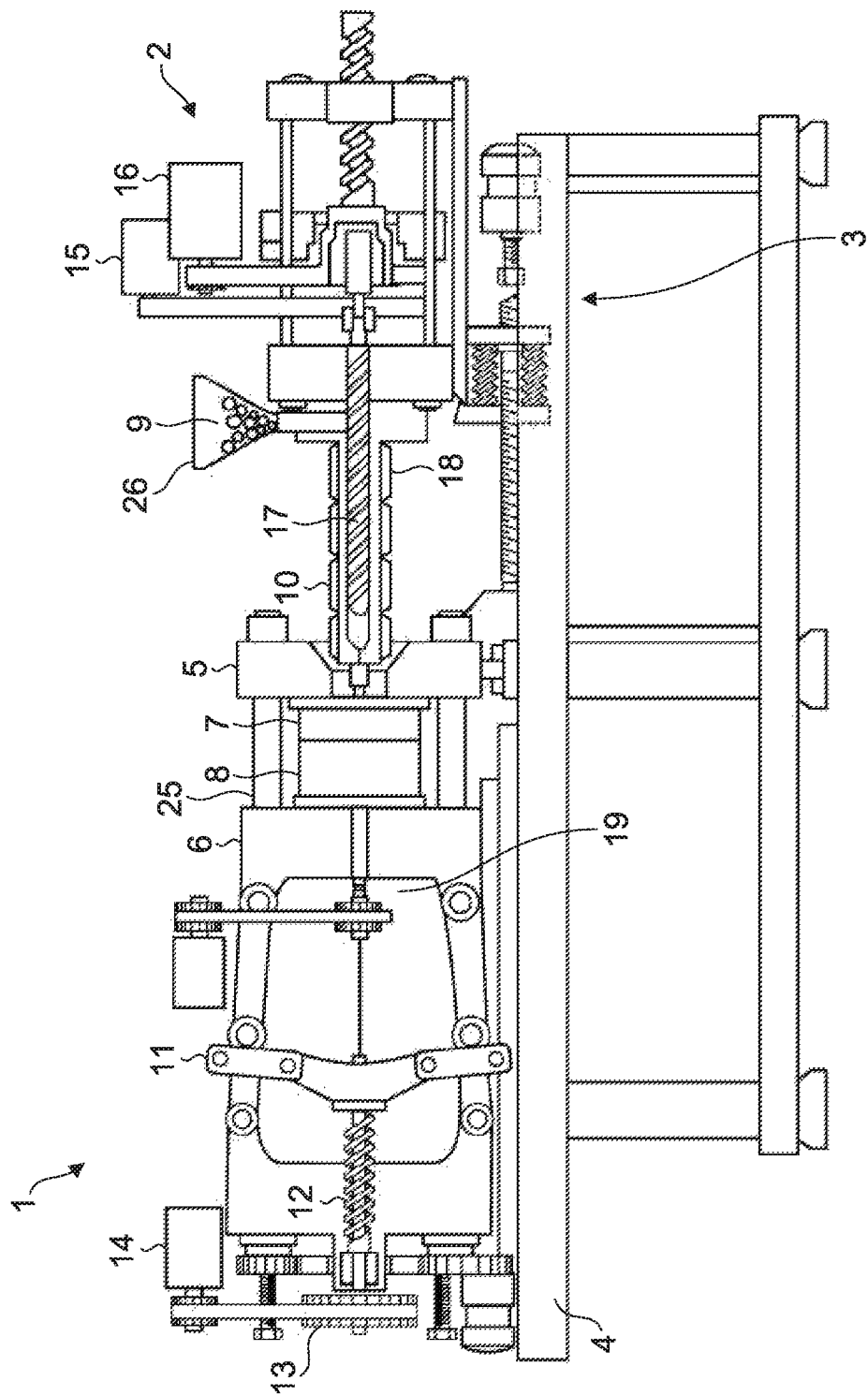
FIG. 5 is a schematic view for illustrating the configuration of a conventional injection molding machine.
Figure 6:
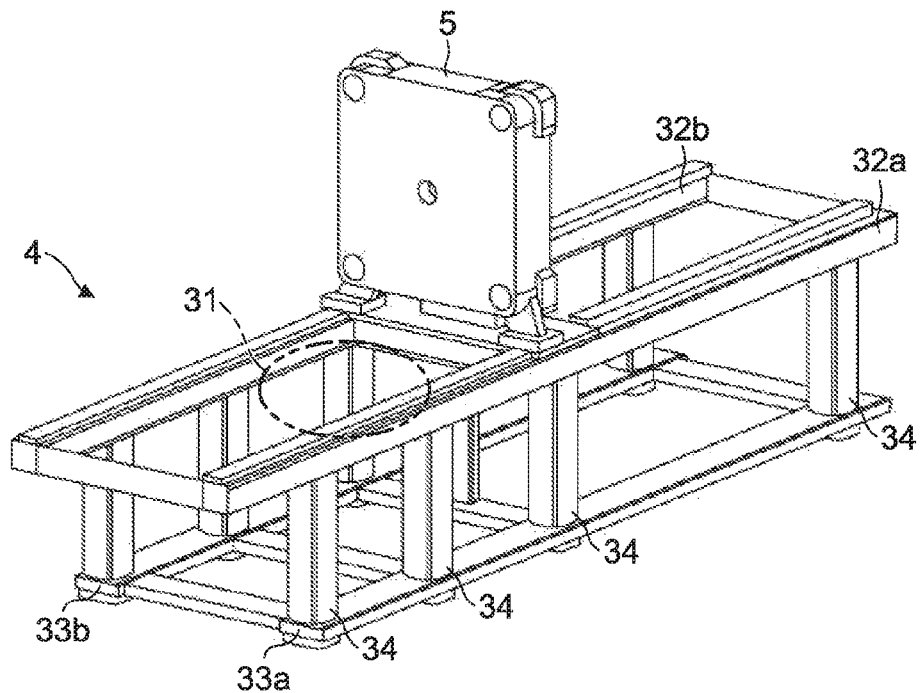
FIG. 6 is a perspective view showing a base frame and a fixed platen of the injection molding machine.
Figure 7:
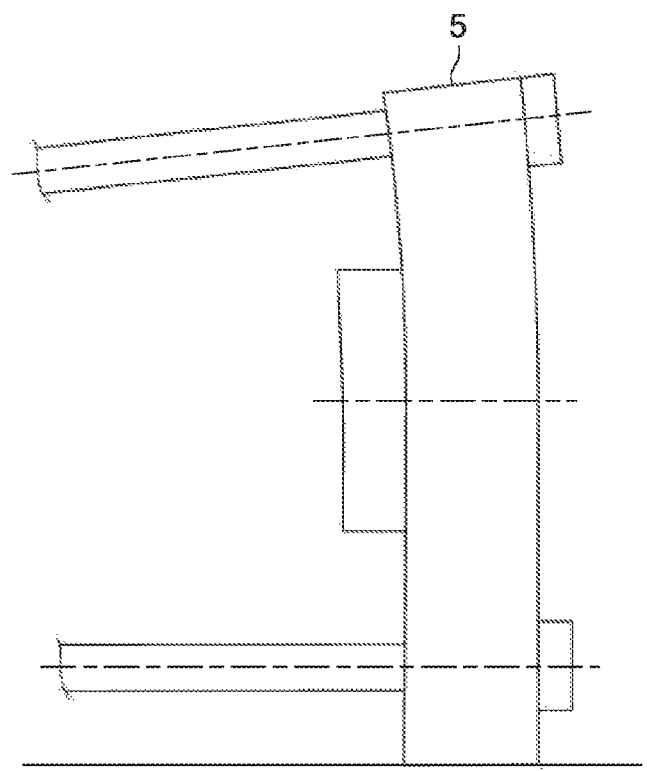
FIG. 7 shows a deformed shape of a fixed platen of a conventional injection molding machine.
Figure 8:
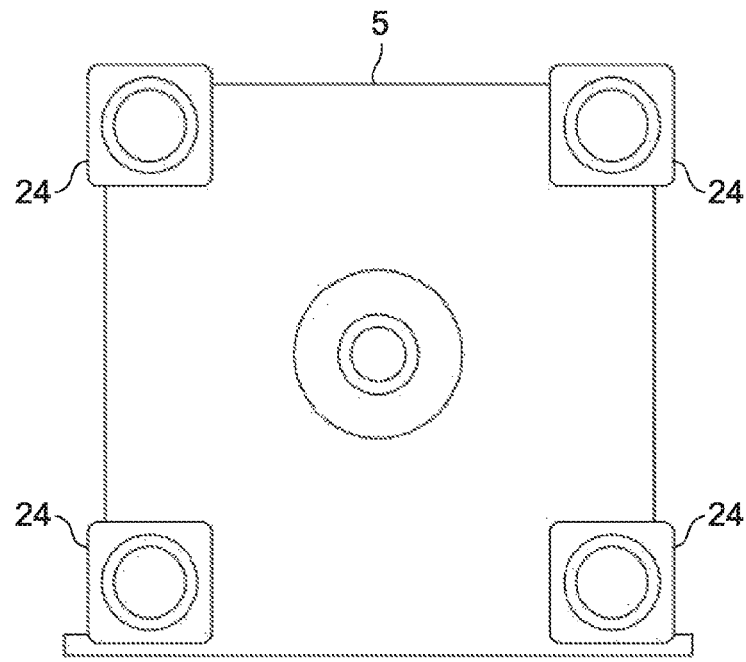
FIG. 8 shows an example of fixation of the fixed platen of the conventional injection molding machine.
Figure 9:
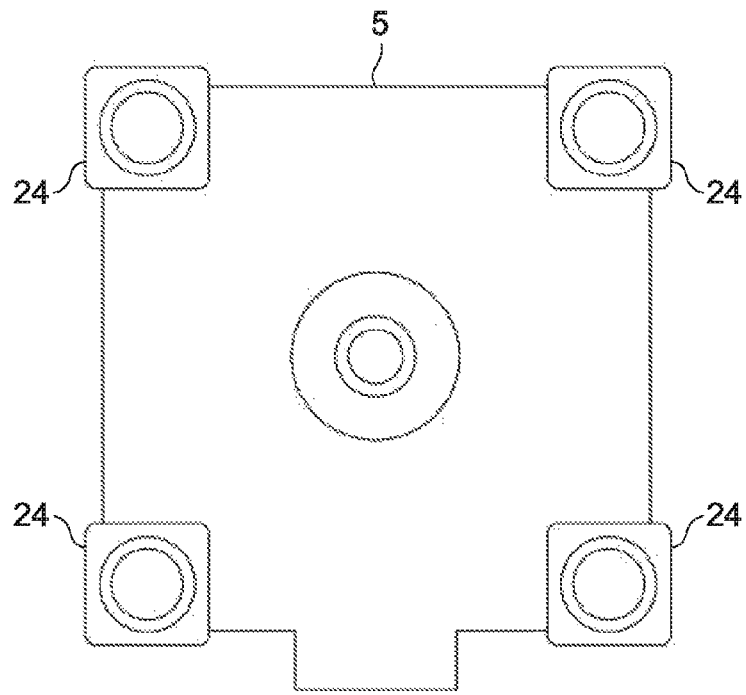
FIG. 9 shows an example of fixation of a fixed platen of a conventional injection molding machine.

FIG. 4 is a side view of a fixed platen 5 according to a second embodiment of the present invention. In the present embodiment, a first leg 21 provided at a substantially central portion with respect to the horizontal direction in a front view is secured to a base frame 4 so as to project on the opposite side to a mold mounting surface of the fixed platen 5. Thus, the space between first and second legs 21 and 22 along an injection axis can be widened, so that the degree of fall of the fixed platen 5 caused by a nozzle touch force generated during nozzle touch operation can be reduced.

In these embodiments, the first leg 21 is located at the central portion of the fixed platen 5. However, the position of the first leg 21 may be somewhat shifted horizontally with the same effect. In these embodiments, moreover, the second legs 22 are located just below the tie-rod insertion parts 24. However, regions near the tie-rod insertion parts 24 can be moderately deformed despite some horizontal shift or misalignment only if the second legs 22 are located near the tie-rod insertion parts 24.

In these embodiments, furthermore, the second legs 22 are located so that the respective thickness-direction centers of the fixed platen 5 and the thin portion 23 are substantially coincident. Although deformation of the upper and lower parts of the fixed platen 5 is better balanced if the thickness-direction centers of the fixed platen 5 and the thin portion 23 are substantially coincident, the location of the second legs 22 may be somewhat shifted longitudinally along the tie rods.

In the embodiments described above, the front and rear surfaces of the thin portion 23 of each second leg 22 are formed substantially parallel to the mold mounting portion of the fixed platen 5. If the thin portion 23 is formed in this manner, the regions near the tie-rod insertion parts 24 are easily deformable. Alternatively, however, the front and rear surfaces of the thin portion 23 may be formed obliquely or curved, not flat.

Alternatively, moreover, vertical posts that connect the upper and lower main pipes (upper main pipes 32 and lower main pipes 33) may be provided at the spots where the first and second legs 21 and 22 of the fixed platen 5 are secured. Thus, the fixed platen 5 can be better kept from falling down.

The invention claimed is:

1. A fixed platen of an injection molding machine, secured to a base frame and capable of supporting a fixed mold, the fixed platen comprising:
    a mold mounting surface capable of being fitted with a mold;
    a tie-rod insertion part at a corner through which a tie rod is configured to be passed for fixation;
    a first leg protruding at a substantially central portion of a lower part and secured to the base frame; and
    a second leg protruding near the tie-rod insertion part at the lower part and secured to the base frame,
    wherein the second leg comprises a thin portion thinner than the fixed platen along the axis of the tie rod and respective thickness-direction centers of the thin portion and the fixed platen are substantially coincident along the axis of the tie rod.

2. The fixed platen of an injection molding machine according to claim 1, wherein the first leg extends in an opposite direction to the mold mounting surface and is secured to the base frame.

* * * * *